US012602169B2

(12) United States Patent
Lien et al.

(10) Patent No.: US 12,602,169 B2
(45) Date of Patent: Apr. 14, 2026

(54) RELIABILITY GAIN IN MEMORY DEVICES WITH ADAPTIVELY SELECTED ERASE POLICIES

(71) Applicant: Micron Technology, Inc., Boise, ID (US)

(72) Inventors: Yu-Chung Lien, San Jose, CA (US); Zhongguang Xu, San Jose, CA (US); Ronit Roneel Prakash, Kanagawa Prefecture (JP); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 120 days.

(21) Appl. No.: 18/521,458

(22) Filed: Nov. 28, 2023

(65) Prior Publication Data

US 2024/0176508 A1 May 30, 2024

Related U.S. Application Data

(60) Provisional application No. 63/428,191, filed on Nov. 28, 2022.

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC .... G06F 3/0619; G06F 3/0659; G06F 3/0679; G06F 3/0652
See application file for complete search history.

(56) References Cited

U.S. PATENT DOCUMENTS

| | | | |
|---|---|---|---|
| 2014/0013032 A1* | 1/2014 | Min | G06F 12/0246 711/103 |
| 2018/0150392 A1* | 5/2018 | Booss | G06F 12/023 |
| 2019/0294333 A1* | 9/2019 | Zaidman | G06F 3/0604 |
| 2020/0225867 A1* | 7/2020 | Lee | G06F 3/0652 |
| 2021/0304827 A1* | 9/2021 | Su | G11C 16/16 |

* cited by examiner

*Primary Examiner* — Hiep T Nguyen
(74) *Attorney, Agent, or Firm* — Lowenstein Sandler LLP

(57) ABSTRACT

A system with a memory device and a processing device operatively coupled with the memory device, to perform operations including identifying a lifecycle state associated with a segment of the memory device, selecting, based on the lifecycle state, an erase policy for performing an erase operation with respect to the segment, and causing the erase operation to be performed with respect to the segment in accordance with the erase policy.

20 Claims, 10 Drawing Sheets

200A
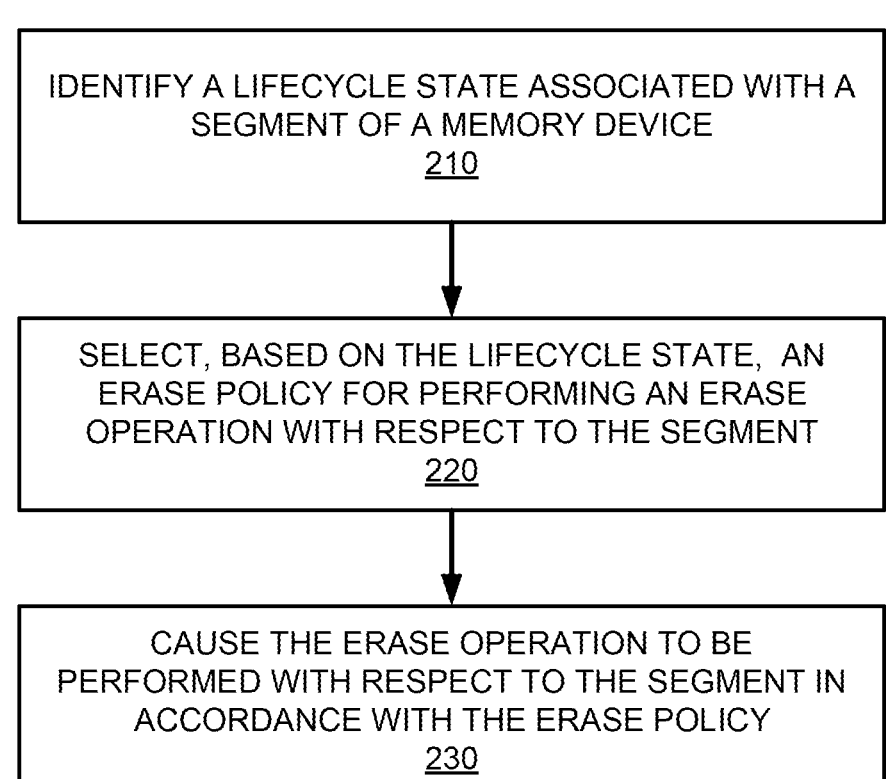
IDENTIFY A LIFECYCLE STATE ASSOCIATED WITH A
SEGMENT OF A MEMORY DEVICE
<u>210</u>
SELECT, BASED ON THE LIFECYCLE STATE, AN
ERASE POLICY FOR PERFORMING AN ERASE
OPERATION WITH RESPECT TO THE SEGMENT
<u>220</u>
CAUSE THE ERASE OPERATION TO BE
PERFORMED WITH RESPECT TO THE SEGMENT IN
ACCORDANCE WITH THE ERASE POLICY
<u>230</u>
FIG. 2A

200B

210

IDENTIFY A LIFECYCLE METRIC
ASSOCIATED WITH THE SEGMENT
211

DETERMINE
WHETHER THE LIFECYCLE
METRIC SATISFIES A THRESHOLD
CONDITION
213

YES                         NO

220

SELECT AN ERASE POLICY
PROVIDING A DELAY
BETWEEN AN ERASE
OPERATION AND A PROGRAM
OPERATION TO PROGRAM
THE SEGMENT AFTER THE
ERASE OPERATION
223

SELECT AN ERASE POLICY
PROVIDING NO DELAY
BETWEEN AN ERASE
OPERATION AND A PROGRAM
OPERATION TO PROGRAM
THE SEGMENT AFTER THE
ERASE OPERATION
227

230   CAUSE AN ERASE OPERATION TO BE PERFORMED ON THE
SEGMENT IN ACCORDANCE WITH THE ERASE POLICY

FIG. 2B

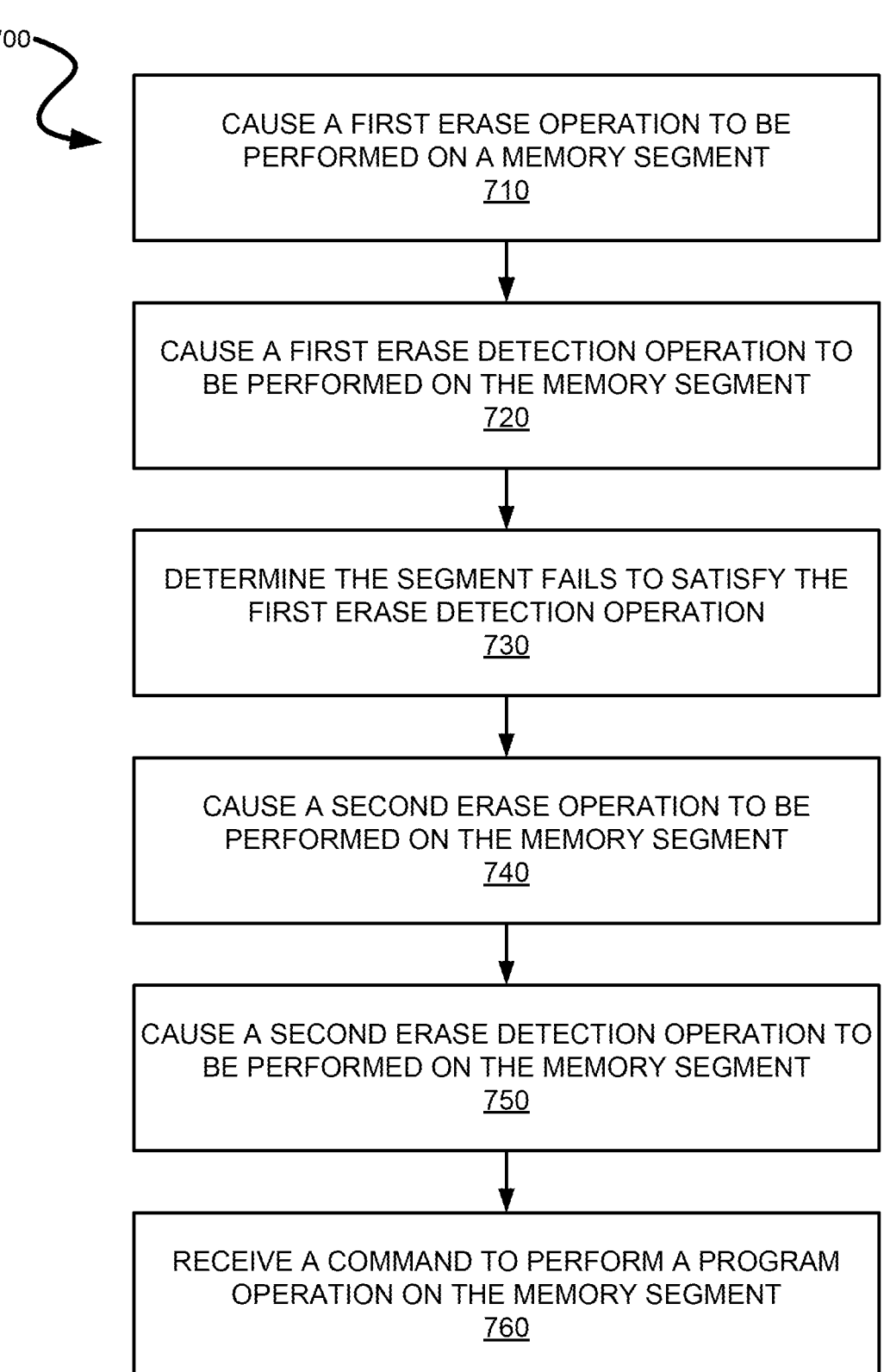

700

CAUSE A FIRST ERASE OPERATION TO BE
PERFORMED ON A MEMORY SEGMENT
710

CAUSE A FIRST ERASE DETECTION OPERATION TO
BE PERFORMED ON THE MEMORY SEGMENT
720

DETERMINE THE SEGMENT FAILS TO SATISFY THE
FIRST ERASE DETECTION OPERATION
730

CAUSE A SECOND ERASE OPERATION TO BE
PERFORMED ON THE MEMORY SEGMENT
740

CAUSE A SECOND ERASE DETECTION OPERATION TO
BE PERFORMED ON THE MEMORY SEGMENT
750

RECEIVE A COMMAND TO PERFORM A PROGRAM
OPERATION ON THE MEMORY SEGMENT
760

FIG. 7

RELIABILITY GAIN IN MEMORY DEVICES WITH ADAPTIVELY SELECTED ERASE POLICIES

RELATED APPLICATION

This application claims the benefit of U.S. Provisional Application No. 63/428,191, filed Nov. 28, 2022, the entire contents of which are hereby incorporated by reference.

TECHNICAL FIELD

Embodiments of the disclosure relate generally to memory sub-systems, and more specifically, relate to applying adaptively selected erase policies to segments of a memory device of a memory sub-system to enhance performance and reliability.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 2A-2B illustrate flow diagrams of example methods to adaptively select and apply an erase policy to a segment of a memory device, in accordance with some embodiments of the present disclosure.

FIG. 7 illustrates a flow diagram of an example method for low stress refresh erase (LSRE) in a memory segment, in accordance with some embodiments of the present disclosure.

DETAILED DESCRIPTION

Figure 1A:
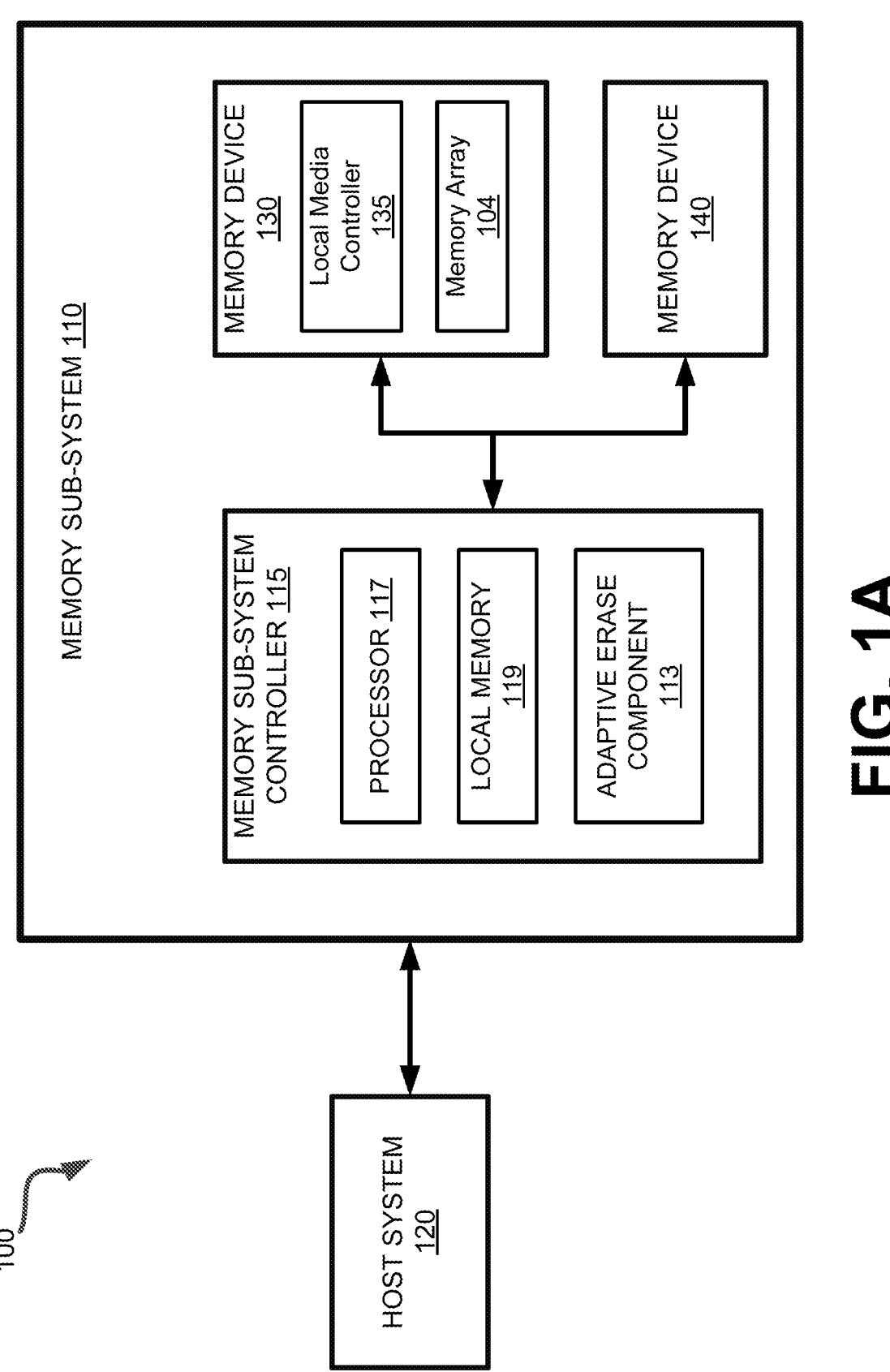
FIG. 1A illustrates an example computing system that includes a memory sub-system in accordance with some embodiments of the present disclosure.

Aspects of the present disclosure are directed to adaptively selecting and applying erase policies for segments of a memory device. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1A. A non-volatile memory device is a package of one or more dies. Each die can include one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. A segment of data can correspond to one or more data addresses in the memory device (e.g., a block, a plurality of blocks, a plurality of cells, etc.). The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data can result in read operations performed on two or more of the memory planes of the memory device.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell between a source electrode and a drain electrode. More specifically, for each individual cell (having a charge Q stored thereon) there can be a threshold control voltage $V_T$ (also referred to as the "threshold voltage") such that the source-drain electric current is low for the control gate voltage ($V_{CG}$) being below the threshold voltage, $V_{CG} < V_T$.

The current increases substantially once the control gate voltage has exceeded the threshold voltage, $V_{CG} > V_T$. Because the actual geometry of the electrodes and gates varies from cell to cell, the threshold voltages can be different even for cells implemented on the same die. The cells can, therefore, be characterized by a distribution P of the threshold voltages, $P(Q, V_T) = dW/dVT$, where dW represents the probability that any given cell has its threshold voltage within the interval $[V_T, V_T + dV_T]$ when charge Q is placed on the cell.

A memory device can exhibit threshold voltage distributions $P(Q, V_T)$ that are narrow compared with the working range of control voltages tolerated by the cells of the device. Accordingly, multiple non-overlapping $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

A valley margin can also be referred to as a read window. For example, in a SLC cell, there is 1 read window that exists with respect to the 2 $V_T$ distributions. As another example, in an MLC cell, there are 3 read windows that exist with respect to the 4 $V_T$ distributions. As yet another example, in a TLC cell, there are 7 read windows that exist with respect to the 8 $V_T$ distributions. Read window size generally decreases as the number of states increases. For example, the 1 read window for the SLC cell can be larger than each of the 3 read windows for the MLC cell, and each of the 3 read windows for the MLC cell can be larger than each of the 7 read windows for the TLC cell etc. Read window budget (RWB) refers to the cumulative value of the read windows.

As memory cell geometries become smaller and data is repeatedly programmed and erased in a memory device, such as a flash memory, the memory device can be more susceptible to errors due to various types of noise and disturb mechanisms within the memory cell, which can be exacerbated with repeated programming. As a result, the reliability of a segment of a memory device and/or the memory device can decrease over time. Given this pattern, the end-of-life (EOL) reliability of the segment and/or the memory device can be lower as compared to the beginning-of-life (BOL) reliability of the segment and/or the memory device.

When there is an insufficient delay between erasing a segment of a memory device and subsequently programming the segment, residual holes can remain trapped in the semiconductor substrate of the segment. Subsequent programing of the segment with the trapped residual holes can result in an inhibited threshold voltage across the segment. The number of residual holes trapped in the semiconductor substrate can depend on a pre-erase data pattern and memory cell characteristic. As a result, some cells can have a larger upshift than other cells, making the threshold voltage distribution width wider, and thus decrease the available RWB. In some implementations, this effect has been compensated for by allowing time after and erase operation for the residual holes to de-trap before programming the segment, and thus improve reliability of the segment. However, some compensation methods (e.g., a delay between erasing a segment and a subsequent segment programming) can, in some circumstances (e.g., memory device BOL, EOL, etc.) reduce the reliability of the segment.

During a program or erase operation on a non-volatile memory device, a selected segment or cell can be programmed or erased by the application of a voltage to one or more selected wordline(s). Due to the wordline being common to multiple memory cells, unselected segments or cells can be subject to the same programming voltage as the selected segments or cells. If not otherwise preconditioned, the unselected segments or cells can experience effects from the programming voltage on the common wordline. The programming voltage effects can include the condition of charge being stored in the unselected segments or cells which are expected to maintain stored data. This programming voltage effect is termed "program disturb." Although a segment or cell affected by program disturb is readable, the contents of the segment or cell can be read as a data value different than the intended data value stored before application of the programming voltage.

Some segments can be designated to be erased before being programmed (e.g., a segment storing data can be erased and then programmed with new data). During the erase operation, relatively high voltages can be applied to the wordline during a pre-program phase of the erase operation, and relatively high voltages can be applied to the channel while applying an erase voltage. For example, some implementations of an erase operation can include applying an initial pre-programming pulse to wordlines of the segment to reset memory cells with a lower threshold voltage. During the erase operation, electrons can be removed, and holes can be injected into the selected wordline (e.g., holes can form in the channel or charge trap layer, allowing electrons to flow into the channel). For example, injected holes can be trapped in storage nitride of array transistors connected to the wordlines that have been erased. Since the channel region (e.g., the pillar) in some non-violative memory devices is a floating channel that might not be connected to a bulk grounded body, it can take a certain amount of time before the residue holes are discharged. Accordingly, these holes can contribute to program disturb in a number of ways.

For example, some methods for programming a segment include performing an erase operation and immediately performing a programming operation. This method can apply an erase policy that can be referred to as zero-delay erase policy (e.g., where "zero-delay" refers to no programmed or pre-determined delay, not necessarily that there will be practically "zero delay" between an erase operation and subsequent program operation). One example of a zero-delay erase policy is an "erase on demand" (EOD) erase policy. However, performing the programming operation immediately following the erase operation can cause residual holes to remain trapped during the programming process. Accordingly, the residual holes might not discharge until after the programming operation is completed, and memory cells programmed to lower threshold voltages or logic states can experience the most programming disturbances. When the residual holes discharge during or after the programming operation, a threshold voltage of memory cells can shift (e.g., the voltage threshold of the memory cells can increase after the residue holes are discharged). This can impact read margins and can cause the contents of the memory cell to be read as a data value different than the intended value stored during the application of the programming voltage.

As another example, some methods for programming a segment include performing an erase operation and then, after a delay, performing a programming operation. This method can be referred to as a non-zero delay erase policy (e.g., where "non-zero delay" refers to a programmed or pre-determined delay that is added between an erase operation and subsequent program operation). One example of a non-zero delay erase policy is a "just-in-time erase" (JiTE) erase policy. In a JiTE erase policy, erased segments are randomly selected to be programmed (e.g., the time between an erase operation and a program operation for a given segment is random). Another example of a non-zero delay erase policy is an "erase in advance" (EIA) erase policy. In an EIA erase policy, erased segments can be systematically selected to be programmed (e.g., the time between an erase operation and a program operation for a given segment is roughly similar to other segments) with a first-in-first out (FIFO) selection process (e.g., the segments which have been erased for the longest time are the segments which are programmed first). An EIA erase policy can guarantee a minimum amount of time between an erase operation and a subsequent programming operation with respect to each segment, whereas there is no such minimum in a JiTE erase policy (due to the random selection operation in a JiTE erase policy). Thus, an EIA erase policy can generally provide a more consistent set of segments to be programmed than a JiTE erase policy, therefore providing improved reliability.

The delay between the erase operation and the programming operation can be used to reduce voltage threshold shift that otherwise can be introduced due to the number of residual holes still trapped in the wordline or channel after the erase operation concludes. However, as the residual holes are discharged, memory cells can experience a voltage threshold shift (e.g., the memory cell threshold voltage can increase due to the discharged residual holes). In some implementations, delay between the erase operation and a programming operation can increase the undesired shift in the threshold voltage of the memory cell (e.g., operations performed on a device at beginning of life affect the device differently than the same operations performed on a device at end of life). In some instances, the threshold voltage shift can cause a further reduction of the RWB following a programming operation, which can be further exaggerated with subsequent erase/program cycles. These effects on the threshold voltage shift in subsequent operations on the segment as the memory device operates normally can cause the RWB of the segment to be smaller than it would have been with a zero-delay erase policy (e.g., an EOD erase policy).

Aspects of the present disclosure address the above and other deficiencies applying adaptively selected erase policies to segments of a memory device for reliability gain. More specifically, embodiments described herein can provide for a controller (e.g., a memory sub-system controller) that can determine which erase policy should be applied to a segment of memory, given a lifecycle state of the segment. In some embodiments, the controller can identify a lifecycle state associated with a segment, select an erase policy for the segment based on the lifecycle state, and cause an erase operation to be performed on the segment in accordance with the erase policy.

In some embodiments, the controller can identify a lifecycle state by determining whether a lifecycle metric satisfies a threshold condition. One example of a lifecycle state is a program/erase (P/E) cycle count. However, other similar lifecycle metrics are contemplated. For example, determining whether the lifecycle metric satisfies the threshold condition can include determining whether the lifecycle metric is greater than or equal to at least one threshold value. In some embodiments, the lifecycle metric can be associated with a beginning of life (BOL) period and/or an end of life (EOL) period of the segment.

The controller can adaptively select an erase policy in response to the determination. For example, in response to determining that the lifecycle metric does not satisfy the threshold condition, the controller can select a zero-delay erase policy (e.g., EOD), and cause an erase operation to be performed on a segment of memory in accordance with the zero-delay erase policy. Further details regarding selecting and applying a zero-delay erase policy will be described below with reference to FIGS. 2A-3. As another example, in response to determining that the lifecycle metric satisfies the threshold condition, the controller can select a non-zero delay erase policy (e.g., JiTE or EIA) and cause an erase operation to be performed on a segment of memory in accordance with the selected non-zero delay erase policy. Further details regarding selecting and applying a non-zero delay erase policy will be described below with reference to FIGS. 2A-B, and FIGS. 4-5.

In some embodiments, applying the erase policy (e.g., a zero-delay erase policy, or non-zero delay erase policy) can include assigning a segment to an intermediate pool (e.g., a garbage pool, a free pool, or a programmable pool, etc.). In some embodiments the intermediate pool can be ordered. In some embodiments, the intermediate pool can run periodic erase detection operations (e.g., a NAND detect erased page (NDEP) check). In some embodiments, prior to segment programming, the controller can apply a low stress refresh erase (LSRE). Application of a LSRE to a segment from the intermediate pool prior to programming the segment can reduce the number of holes trapped in the wordline and/or channel. The LSRE can use a lower erase voltage and can result in an overall reduction of programming disturbances in an erased segment, and thus result in an overall increase in system performance.

The methods described herein, such as adaptive erase policy methods, can be implemented with any suitable memory device architecture in accordance with the embodiments described herein. In one embodiment, the method can be implemented with a memory device implementing replacement gate NAND (RG NAND) technology. A replacement gate (RG) NAND device is a NAND device that implements an RG architecture rather than a floating gate (FG) architecture. The RG NAND architecture removes cell gaps that are typically found in FG NAND architectures, thereby reducing, or eliminating capacitance resulting from those cell gaps. More specifically, the RG NAND architecture corresponds to a single-insulated structure. The RG NAND architecture can enable a smaller size, improved read and program latency, and increase in transfer rate as compared to the FG NAND architecture. Further details regarding improving reliability gain in a memory device by applying an adaptively selected erase policy to a segment of the memory device will be described below with reference to FIGS. 1A-8.

Advantages of the present disclosure include, but are not limited to, improved memory device performance and reliability. For example, embodiments described herein can achieved improved memory segment reliability across a lifespan of a memory segment or device. Accordingly, embodiments described herein can be implemented to reduce read errors and increase the life of a memory device.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to program data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system

120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes an adaptive erase policy (AEP) component 113 that can adaptively select and apply erase policies to segments of the memory device 130 based on memory lifecycle states or similar metrics. In some embodiments, the memory sub-system controller 115 includes at least a portion of the AEP component 113. In some embodiments, the AEP component 113 is part of the host system 120, an application, or an operating system. In other embodiments, local media controller 135 includes at least a portion of AEP component 113 and is configured to perform the functionality described herein.

The AEP component 113 can include processing logic to adaptively select an erase policy to apply to a segment of the memory device 130 (e.g., a segment of the memory array 104). In some embodiments, the AEP component 113 can identify a lifecycle state associated with a segment, select an erase policy for the segment based on the lifecycle state, and cause an erase operation to be performed on the segment in accordance with the erase policy.

In some embodiments, the AEP component 113 can identify a lifecycle state by determining whether a lifecycle metric satisfies a threshold condition. One example of a lifecycle state is a P/E cycle count. However, other similar lifecycle metrics are contemplated. For example, determining whether the lifecycle metric satisfies the threshold condition can include determining whether the lifecycle metric is greater than or equal to at least one threshold value. In some embodiments, the lifecycle metric is associated with a beginning of life (BOL) period and/or an end of life (EOL) period of the segment.

The AEP component 113 can adaptively select an erase policy in response to the determination. For example, in response to determining that the lifecycle metric does not satisfy the threshold condition, the AEP component 113 can select a zero-delay erase policy (e.g., EOD), and cause an erase operation to be performed on a segment of memory in accordance with the zero-delay erase policy. As another example, in response to determining that the lifecycle metric satisfies the threshold condition, the AEP component 113 can select a non-zero delay erase policy (e.g., JiTE or EIA) and cause an erase operation to be performed on a segment of memory in accordance with the selected non-zero delay erase policy.

In some embodiments, applying the erase policy (e.g., a zero-delay, or non-zero delay erase policy) can include assigning a segment to an intermediate pool (e.g., a garbage pool, a free pool, or a programmable pool, etc.). In some embodiments the intermediate pool can be ordered. In some embodiments, the intermediate pool can run periodic erase detection operations (e.g., an NDEP check). In some embodiments, prior to segment programming, the AEP component 113 can apply a low stress refresh erase (LSRE). Application of a LSRE to a segment from the intermediate pool prior to programming the segment can reduce the number of holes trapped in the wordline and/or channel. The LSRE can use a lower erase voltage and can result in an overall reduction of programming disturbances in an erased segment, and thus result in an overall increase in system performance. Further details with regards to the operations of the AEP component 113 will be described below with reference to FIGS. 2A-7.

Figure 1B:
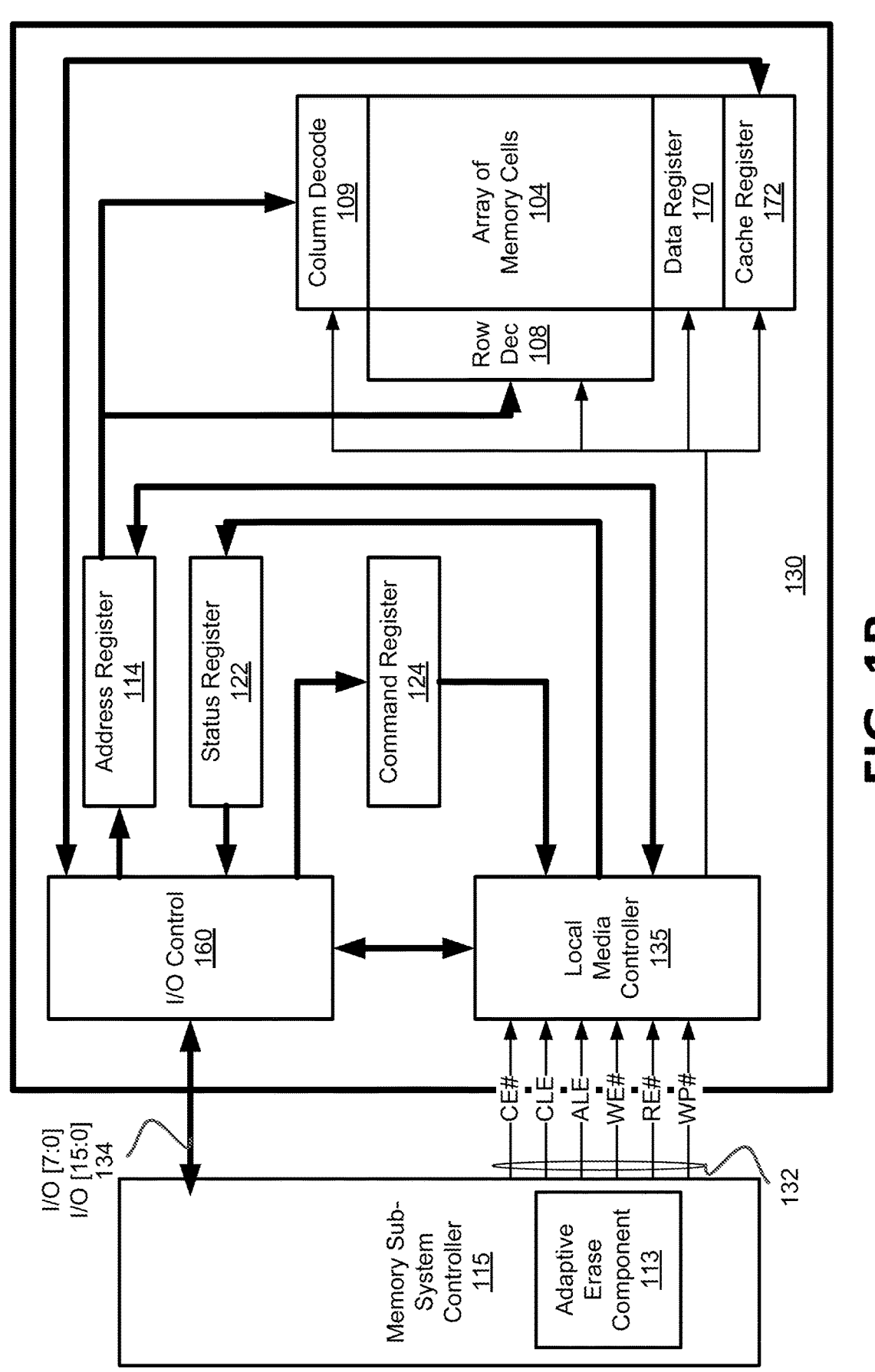
FIG. 1B illustrates an example block diagram of a memory device in communication with a memory sub-system controller of a memory sub-system, in accordance with some embodiments of the present disclosure.

FIG. 1B illustrates an example simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device. The memory sub-system controller 115 can include the adaptive erase component 113.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line can be associated with more than one logical row of memory cells and a single data line can be associated with more than one logical column. Memory cells (not shown in FIG. 1B) of at least a portion of array of memory cells 104 are capable of being programmed to one of at least two target data states. In one embodiment, the array of memory cells 104 (i.e., a "memory array") can include a number of sacrificial memory cells used to detect the occurrence of read disturb in memory device 130, as described in detail herein.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data can be passed from the cache register 172 to the data register 170 for transfer to the array of memory cells 104; then new data can be latched in the cache register 172 from the I/O control circuitry 160. During a read operation, data can be passed from the cache register 172 to the I/O control circuitry 160 for output to the memory sub-system controller 115; then new data can be passed from the data register 170 to the cache register 172. The cache register 172 and/or the data register 170 can form (e.g., can form a portion of) a page buffer of the memory device 130. A page buffer can further include sensing devices (not shown in FIG. 1B) to sense a data state of a memory cell of the array of memory cells 104, e.g., by sensing a state of a data line connected to that memory cell. A status register 122 can be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 160 and can then be written into command register 124. The addresses can be received over input/output (I/O) pins [7:0] of I/O bus 134 at I/O control circuitry 160 and can then be written into address register 114. The data can be received over input/output (I/O) pins [7:0] for an 8-bit device or input/output (I/O) pins [15:0] for a 16-bit device at I/O control circuitry 160 and then can be written into cache register 172. The data can be subsequently written into data register 170 for programming the array of memory cells 104.

In an embodiment, cache register 172 can be omitted, and the data can be written directly into data register 170. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B can not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

FIG. 2A illustrates a flow diagram of an example method 200A to adaptively select and apply an erase policy to a segment of a memory device, in accordance with some embodiments of the present disclosure. The method 200A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method 200A is performed by the AEP component 113 of FIG. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, processing logic identifies a lifecycle state associated with a segment of a memory device. In some embodiments, the lifecycle state can correspond to a wear-state associated with the memory segment. In some embodiments, as will be described in further detail below with reference to FIG. 2B, the lifecycle state can be determined based on a lifecycle metric (e.g., P/E cycle count). The processing logic can obtain the lifecycle metric from a database stored in a memory sub-system, such as memory sub-system 110 as described with respect to FIG. 1A. In some embodiments, the lifecycle state can be dynamically tracked. In some embodiments, the lifecycle state can be reset or altered by processing logic (e.g., a memory operation such as a read operation, program operation, erase operation, etc.). In some embodiments, two or more lifecycle states can be associated with a segment of a memory device. In some embodiments, operation 210 can include additional processing logic for obtaining a lifecycle state.

At operation 220, the processing logic selects, based on the lifecycle state, an erase policy for performing an erase operation with respect to the segment. In some embodiments, processing logic can select an erase policy to improve segment reliability and/or performance. In some embodiments, processing logic might have previously associated another erase policy with the segment (e.g., the segment may have an associated erase policy before processing logic applies method 200A). In some embodiments, processing logic might not associate an erase policy with the segment until after the lifecycle state has been identified by operation 210.

In some embodiments, the erase policy can be a zero-delay erase policy (e.g., an EOD erase policy). Further details regarding the zero-delay erase policy (e.g. EOD erase policy) will be described below with reference to FIG. 3. In some embodiments, the erase policy can be a non-zero delay erase policy (i.e., a policy with a delay after an erase operation, but before a program operation). One example of a non-zero delay erase policy is a JiTE erase policy. Further details regarding the JiTE policy will be described below with reference to FIG. 4. Another example of a non-zero delay erase policy is an EIA erase policy. Further details regarding the EIA erase policy will be described below with reference to FIG. 5.

At operation 230, the processing logic causes an erase operation to be performed with respect to the segment in accordance with the erase policy. In some embodiments, processing logic can program the segment after the segment is erased. In some embodiments, processing logic can erase a segment by causing cells within the segment to have the same voltage state (e.g., an erase state). In some embodiments, processing logic can cause an erase state to be a "high" voltage state. In some embodiments, processing logic can cause the erase state to correspond to a certain voltage level, or set of voltage levels for each cell or set of cells within the segment. In some embodiments, processing logic can erase a segment by assigning the segment to an intermediate pool, or set of pools (e.g., a garbage pool, free pool, programmable pool, etc.). In some embodiments, processing logic can erase the segment upon assignment the segment to an intermediate pool (e.g., processing logic can erase the segment in conjunction with, or parallel to processing logic that has assigned the segment to an intermediate pool). In some embodiments, processing logic can erase the segment after assigning the segment to an intermediate pool. In some embodiments, processing logic can erase the segment while the segment is assigned to an intermediate pool. In some embodiments, processing logic can erase the segment upon unassigning the segment from the intermediate pool. In some embodiments, processing logic can reassign the segment from the intermediate pool to another intermediate pool. In some embodiments, processing logic can determine when to assign the segment to an intermediate pool. In some embodiments, processing logic can randomly select a segment and reassign the segment from one intermediate pool (e.g., the garbage pool) to another intermediate pool (e.g., the free pool). In some embodiments, processing logic can select the segment based on a length of time the segment has been assigned to the intermediate pool (i.e., the garbage pool) and reassign the segment to another intermediate pool (e.g., the free pool). In some embodiments, processing logic can perform the erase operation and/or program operation on two or more segments in parallel (e.g., simultaneously).

FIG. 2B illustrates a flow diagram of an example method 200B to adaptively select and apply an erase policy to a segment of a memory device, in accordance with some embodiments of the present disclosure. The method 200B described with respect to FIG. 2B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200B is performed by the AEP component 113 of FIG. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Operation 210 includes operation 211 and operation 213 to identify a lifecycle state associated with a segment of a memory device. At operation 211, processing logic identifies a lifecycle metric associated with a segment of a memory device. In some embodiments, the lifecycle metric can correspond to a wear metric for the memory segment or memory device. In some embodiments, the lifecycle metric can correspond to a programming age of the memory segment. In certain embodiments, the lifecycle metric can be a P/E cycle count. In some embodiments, processing logic can assign or identify two or more lifecycle metrics associated with a segment of memory. In some embodiments, processing logic can store the lifecycle metric in a database. In some embodiments, processing logic can dynamically update the lifecycle metric. In some embodiments, processing logic can reset or alter the lifecycle metric based on memory operations (e.g., read operations, program operations, erase operations, etc.).

At operation 213, processing logic determines whether the lifecycle metric of operation 211 satisfies a threshold condition. In some embodiments, processing logic can assign or identify two or more threshold conditions associated with a segment of memory. In some embodiments, processing logic can store the threshold condition in a database. In some embodiments, processing logic can dynamically update the threshold condition. In some embodiments, processing logic can reset or alter the threshold condition based on memory operations (e.g., read operations, program operations, erase operations, etc.). In some embodiments, determining whether the lifecycle metric satisfies the threshold condition includes determining whether the lifecycle metric is greater than or equal to at least one threshold value. For example, the threshold value can be a P/E cycle count threshold.

Operation 220 includes operation 223 and operation 227 to select, based on the lifecycle state, an erase policy. The erase policy can be selected to maximize the RWB of the segment in accordance with the lifecycle metric. In some embodiments, the segment can be associated with an erase policy prior to operation 220 (e.g., the segment may have an associated erase policy before processing logic applies method 200B). In some embodiments, a segment might not have an associated erase policy prior to operation 220.

More specifically, in response to determining that the lifecycle metric satisfies the threshold condition (e.g., the lifecycle metric is greater than or equal to the at least one threshold), processing logic at operation 223 selects an erase policy providing a delay between an erase operation and a program operation (e.g., a non-zero delay erase policy). In certain embodiments, a non-zero delay erase policy can be JiTE erase policy. In certain embodiments, a non-zero delay erase policy can be an EIA erase policy. In some embodiments, a non-zero delay erase policy can be another erase policy which implements a delay between erasing a segment and subsequently programming the same segment. Further details regarding non-zero delay erase policies (e.g., the JiTE and EIA erase policies) will be described below with reference to FIGS. 4-5.

In response to determining that the lifecycle metric satisfies the threshold condition (e.g., the lifecycle metric is greater than or equal to the at least one threshold), processing logic at operation 227 selects an erase policy providing no delay between an erase operation and a subsequent program operation (e.g., a zero-delay erase policy). In certain embodiments, a zero-delay erase policy can be an EOD erase policy. In some embodiments a zero-delay erase policy can be another erase policy which does not implement a delay between erasing a segment and subsequently programming the same segment. Further details regarding a zero-delay erase policy will be described below with reference to FIG. 3.

At operation 230, processing logic can cause an erase operation to be performed on the segment in accordance with the erase policy, as described with respect to FIG. 2A. Further details regarding operations 210-230 are described above with reference to FIGS. 1A-2A and will now be described below with reference to FIGS. 3-5.

Figure 3:
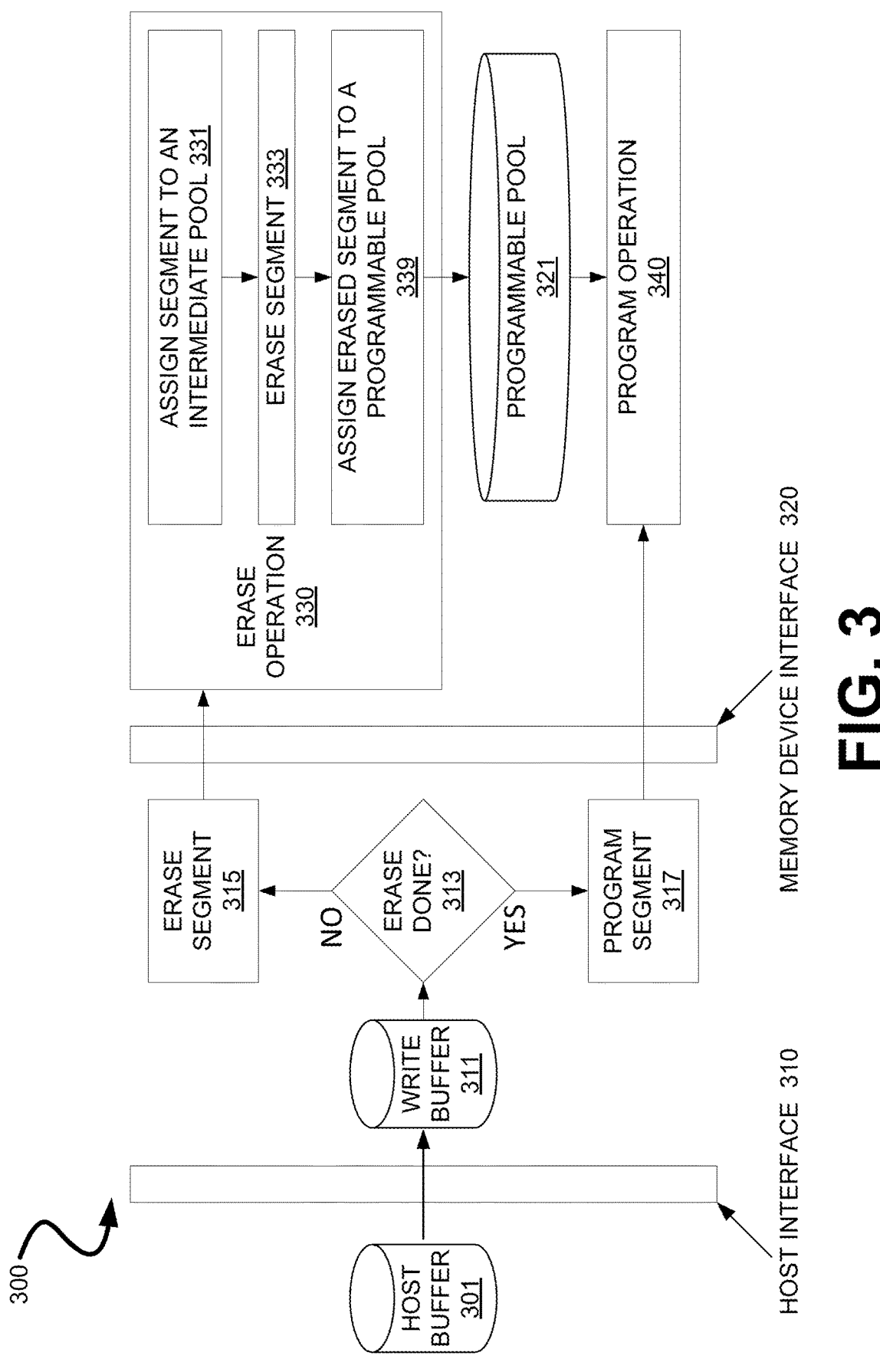
FIG. 3 illustrates an example system applying a zero-delay erase policy, in accordance with some embodiments of the present disclosure.

FIG. 3 illustrates a diagram of an example system 300 for implementing a zero-delay erase policy, in accordance with some embodiments of the present disclosure. For example, the system 300 can implement an EOD delay erase policy. In some embodiments, system 300 can be included within a computing system, such the computing system 100 as described above with respect to FIGS. 1A-B. In some embodiments, system 300 can apply a zero-delay erase policy adaptively selected in accordance with method 200A and/or method 200B as described above with respect to FIG. 2A-B.

The system 300 includes a host buffer 301 of a host system (e.g., the host system 120 of FIG. 1A) and a buffer 311 of a memory sub-system (e.g., the memory sub-system 110 of FIG. 1A). Write buffer 311 stores write requests received from host buffer 301. A memory sub-system controller (e.g., memory sub-system controller 115 of FIGS. 1A-1B) determines whether an erase with respect to a segment of a memory device (e.g., the memory device 130 of FIGS. 1A-1B) is done at operation 313. If the erase is determined to not be done, the memory sub-system controller can send, via a memory device interface 320, an erase segment command to erase the segment at operation 315. More specifically, the erase segment command can be a command to initiate or continue an erase operation 330 to erase the segment. If the erase is determined to be done, then the memory sub-system controller can send, via the memory device interface 320, a program segment command to program the segment at operation 317. More specifically, the program segment command can be a command to initiate or continue a program operation to program to the segment). In some embodiments, operations 315 and 317 can be performed serially.

A local media controller (e.g., the local media controller 135 of FIGS. 1A-1B) can receive the erase segment command to perform the erase operation 330 and/or the program segment command to perform the program operation 340. To perform the erase operation 330, the local media controller can select the segment to erase. To perform the program operation 340, the local media controller can select a segment to program. In some embodiments, the erase operation 330 can prepare the segment to be programmed with new data during the program operation 340.

Erase operation 330 can include sub-operations, such as sub-operations 331, 333, and 339 shown here. At sub-operation 331, the local media controller assigns the segment to an intermediate pool. In some embodiments, the intermediate pool can be a garbage pool. The assignment of the segment to the garbage pool can signify that the segment can be programmed. In some embodiments, assigning the segment to the intermediate pool can include reassigning the segment from the garbage pool to another intermediate pool. In some embodiments, the local media controller can assign a segment to two or more intermediate pools before the segment can be programmed.

At sub-operation 333, the local media controller erases the segment to obtain an erased segment. In some embodiments, the segment can be erased by setting the cells in the segment to an erase voltage level or set of erase voltage levels. In some embodiments, the local media controller can assign an erase voltage as a "high" voltage for the cells in the segment. In some embodiments, the local media controller can erase a segment by assigning the segment to an intermediate pool (e.g., the intermediate pool of 331).

At sub-operation 339, the local media controller assigns the erased segment to programmable pool 321. In some embodiments, the local media controller can assign erased segments to programmable pool 321 in order (e.g., first-in first-out (FIFO)). In some embodiments, the local media controller can randomly assign erased segments to programmable pool 321. In some embodiments, programmable pool 321 includes fully erased segments. In some embodiments, by assigning the erased segment to programmable pool 321, the processing logic is signifying that the segment can be programmed.

To perform the program operation, the local media controller causes an erased segment to be programmed at operation 340. In some embodiments, processing logic can select the erased segment to be programmed from programmable pool 321. In some embodiments, the local media controller can program a segment whose cells have not been reset to a uniform "erase" voltage level (e.g., an erase voltage or erase state). In some embodiments, there can be no delay between removing the segment from the programmable pool and programming the segment. In some embodiments, a delay in programming a newly erased segment might be unintentional.

Figure 4:
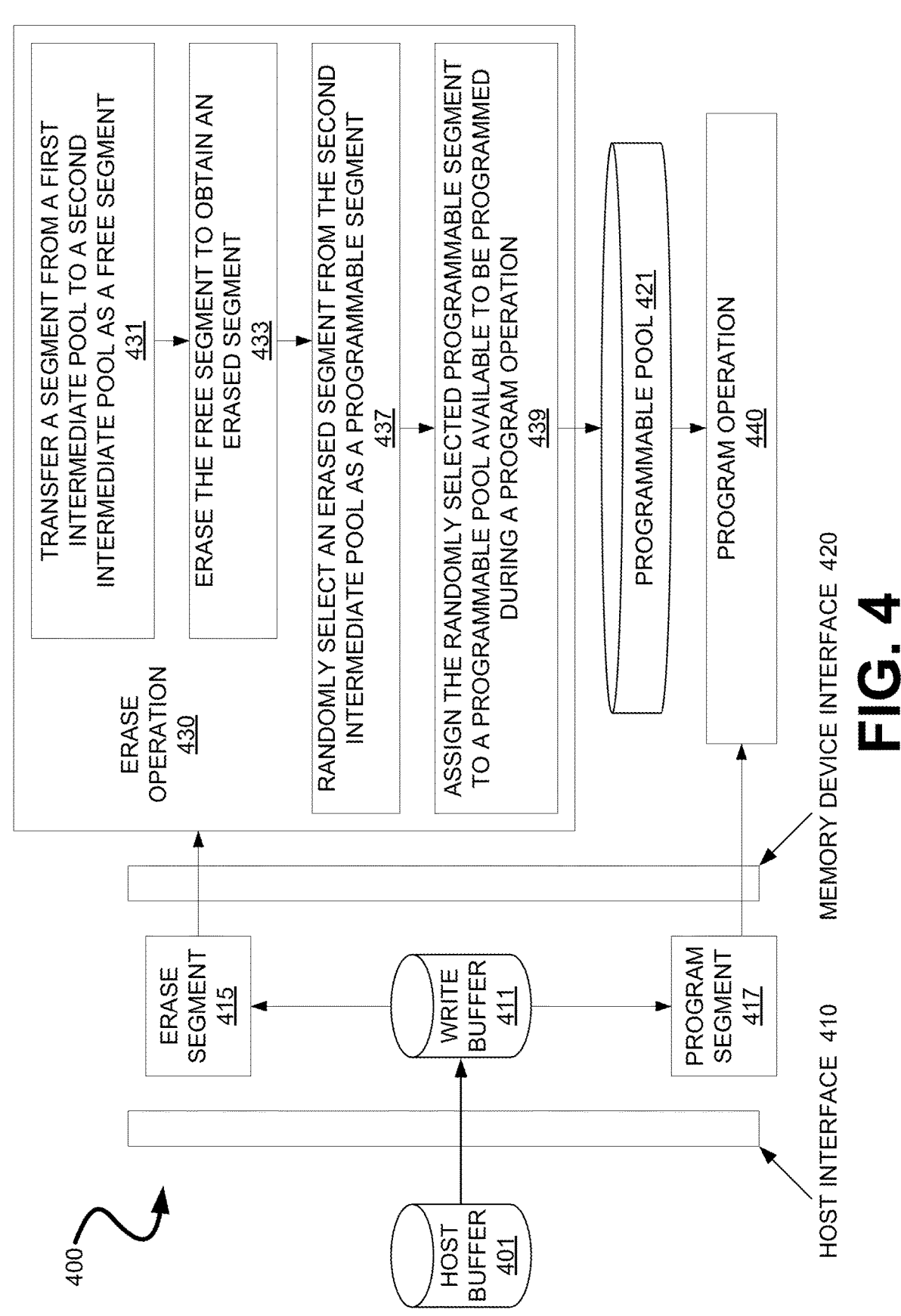
FIG. 4 illustrates an example system applying a non-zero delay erase policy, in accordance with some embodiments of the present disclosure.

FIG. 4 illustrates an example system 400 implementing a non-zero delay erase policy (e.g., where a delay follows an erase operation before a subsequent programming operation, such as a JiTE erase policy). In many embodiments, system 400 can be a memory sub-system, such as memory subsystem 110 as described with respect to FIG. 1A-B. In many embodiments, system 400 can implement a method, such as method 200 as described with respect to FIG. 2A-B.

The system 400 includes host buffer 401 of a host system (e.g., the host system 120 of FIG. 1A) and a buffer 411 of a memory sub-system (e.g., the memory sub-system 110 of FIG. 1A). Program buffer 411 stores program requests received from host buffer 401. A memory sub-system controller (e.g., memory sub-system controller 115 of FIGS. 1A-1B) can send, via a memory interface device 420, an erase segment command to erase the segment at operation 415. More specifically, the erase segment command can be a command to initiate or continue an erase operation 430 to erase the segment. The memory sub-system controller can send, via the memory interface device 420, a program segment command to program the segment at operation 417. More specifically, the program segment command can be a command to initiate or continue a program operation to program the segment. In some embodiments, operations 415, and 417, can be performed serially or in parallel.

A local media controller (e.g., the local media controller 135 of FIGS. 1A-1B) can receive the erase segment command to perform the erase operation 430 and/or the program segment command to perform the program operation 440. To perform the erase operation 430, the local media controller can select the segment to erase. To perform the program operation 440, the local media controller can select the segment to program. In many embodiments, the erase operation 430 can prepare the segment to be programmed with new data during the program operation 440.

Erase operation 430 can include sub-operations, such as sub-operations 431, 433, 437, and 439 shown here. At sub-operation 431, the local media controller transfers the segment from a first intermediate pool to a second intermediate pool as a free segment. In some embodiments, the first intermediate pool can be a garbage pool. The assignment of the segment to the garbage pool can indicate that the segment can be programmed. In some embodiments, the second intermediate pool can be a free pool. The assignment of the segment to the free pool can indicate that the segment can be programmed. In some embodiments, assigning the segment to the first intermediate pool can include reassigning the segment from the garbage pool to another intermediate pool. In some embodiments, the local media controller can assign a segment to two or more intermediate pools before the segment can be programmed.

At sub-operation 433, processing logic erases the segment in the second intermediate pool to obtain an erased segment. In some embodiments, the segment can be erased by setting the cells in the segment to an erase voltage level or set of erase voltage levels. In some embodiments, the local media controller can assign an erase voltage as a "high" voltage for the cells in the segment. In some embodiments, the local media controller can erase a segment by assigning the segment to an intermediate pool (e.g., the first intermediate pool of 431 or the second intermediate pool of 431, etc.).

At sub-operation 437, the local media controller randomly selects a segment from the second intermediate pool as a programmable segment. In some embodiments, processing logic might not track the amount of time a segment has been in an intermediate pool (e.g., the first and/or second intermediate pools of sub-operations 433 and 437). In some embodiments, by selecting a segment from an intermediate pool (e.g., the free pool of sub-operations 433 and 437), the processing logic is indicating that the segment can be programmed.

At sub-operation 439, the local media controller assigns the randomly selected programmable segment to a programmable pool available to be programmed during a program operation. In some embodiments, the programmable pool can be programmable pool 421. In some embodiments, the local media controller can assign erased segments to programmable pool 421. In some embodiments, programmable pool 421 can include fully erased segments. In some embodiments, by assigning the erased segment to programmable pool 421, the processing logic is indicating that the segment can be programmed.

To perform the program operation, the local media controller causes an erased segment to be programmed at operation 440. In some embodiments, processing logic can select the erased segment to be programmed from programmable pool 421. In some embodiments, processing logic can select the programmable segment from programmable pool 421 to be programmed. In some embodiments, the local media controller can program a segment whose cells have not been reset to a uniform erase voltage level (e.g., an erase voltage or erase state). In some embodiments, there can be a delay between removing the segment from the programmable pool and programming the segment. In some embodiments, processing logic can apply a delay before programming the segment from programmable pool 421.

Figure 5:
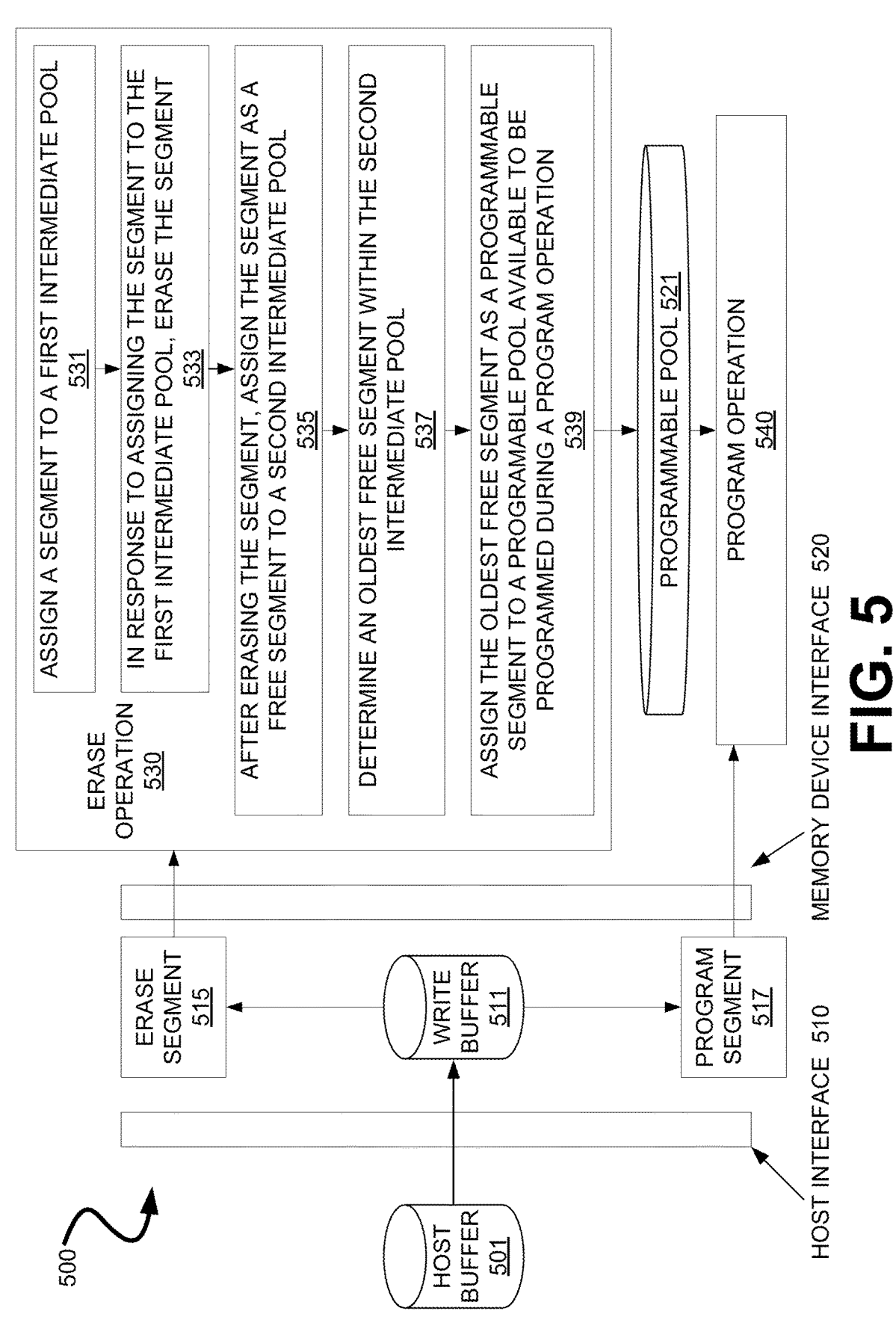
FIG. 5 illustrates an example system applying a non-zero delay erase policy, in accordance with some embodiments of the present disclosure.

FIG. 5 illustrates an example system 500 implementing a non-zero delay erase policy (e.g., where a delay follows an erase operation before a subsequent programming operation, such as a EIA erase policy). In many embodiments, system 500 can be a memory subsystem such as memory subsystem 110 as described with respect to FIG. 1A-B. In many embodiments, system 500 can implement a method, such as method 200 as described with respect to FIG. 2A-B.

The system 500 includes host buffer 501 of a host system (e.g., the host system 120 of FIG. 1A) and a buffer 411 of a memory sub-system (e.g., the memory sub-system 110 of FIG. 1A). Program buffer 511 stores program requests received from host buffer 501. A memory sub-system controller (e.g., memory sub-system controller 115 of FIGS. 1A-1B) can send, via a memory interface device 520, an erase segment command to erase the segment at operation 515. More specifically, the erase segment command can be a command to initiate or continue an erase operation 530 to erase the segment. The memory sub-system controller can send, via the memory interface device 420, a program segment command to program the segment at operation 517. More specifically, the program segment command can be a command to initiate or continue a program operation to program the segment. In some embodiments, operations 515, and 517, can be performed serially or in parallel.

A local media controller (e.g., the local media controller 135 of FIGS. 1A-1B) can receive the erase segment command to perform the erase operation 530 and/or the program segment command to perform the program operation 540.

To perform the erase operation 530, the local media controller can select the segment to erase. To perform the program operation 540, the local media controller can select the segment to program. In some embodiments, the erase operation 530 can prepare the segment to be programmed with new data during the program operation 440.

Erase operation 530 can include sub-operations, such as sub-operations 531, 533, 537, and 539 shown here. At sub-operation 531, the local media controller assigns the segment to a first intermediate pool. In some embodiments, the first intermediate pool can be a garbage pool. The assignment of the segment to the garbage pool can indicate that the segment can be programmed. In some embodiments, assigning the segment to the first intermediate pool can include reassigning the segment from the garbage pool to another intermediate pool. In some embodiments, the local media controller can assign a segment to two or more intermediate pools before the segment can be programmed.

At sub-operation 533, in response to assigning the segment to the first intermediate pool, processing logic erases the segment to obtain an erased segment. In some embodiments, the segment can be erased by setting the cells in the segment to an erase voltage level or set of erase voltage levels. In some embodiments, the local media controller can assign an erase voltage as a "high" voltage for the cells in the segment. In some embodiments, the local media controller can erase a segment by assigning the segment to an intermediate pool (e.g., the first intermediate pool of 531, etc.).

At sub-operation 535, after erasing the segment, the local media controller assigns the segment as a free segment to a second intermediate pool. In some embodiments, the second intermediate pool can be a free pool. The assignment of the segment to the free pool can indicate that the segment can be programmed. In some embodiments, assigning the segment to the second intermediate pool can include reassigning the segment from the free pool to another intermediate pool. In some embodiments, assignment as a free segment can indicate the segment can be programmed.

At sub-operation 537, processing logic determines an oldest segment in the second intermediate pool. In some embodiments, processing logic can determine an oldest segment in a free pool. In some embodiments, by selecting a segment from an intermediate pool (e.g., the garbage pool of sub-operation 531, or the free pool of sub-operations 535), the processing logic is indicating that the segment can be programmed.

At sub-operation 539, the local media controller assigns the oldest free segment as a programmable segment to a programmable pool available to be programmed during a program operation. In some embodiments, the programmable pool can be programmable pool 521. In some embodiments, the local media controller can assign erased segments to programmable pool 521 in order (e.g., first-in-first-out (FIFO)). In some embodiments, programmable pool 521 can include fully erased segments. In some embodiments, by assigning the oldest free segment to programmable pool 521, the processing logic is indicating that the segment can be programmed. To perform the program operation, the local media controller causes an erased segment to be programmed at operation 540. In some embodiments, processing logic can select the erased segment to be programmed from programmable pool 421. In some embodiments, processing logic can select the programmable segment from programmable pool 521 to be programmed. In some embodiments, the local media controller can program a segment whose cells have not been reset to a uniform erase voltage level (e.g., an erase voltage or erase state). In some embodiments, there can be a delay between removing the segment from the programmable pool and programming the segment. In some embodiments, processing logic can apply a delay before programming the segment from programmable pool 521.

Figure 6:
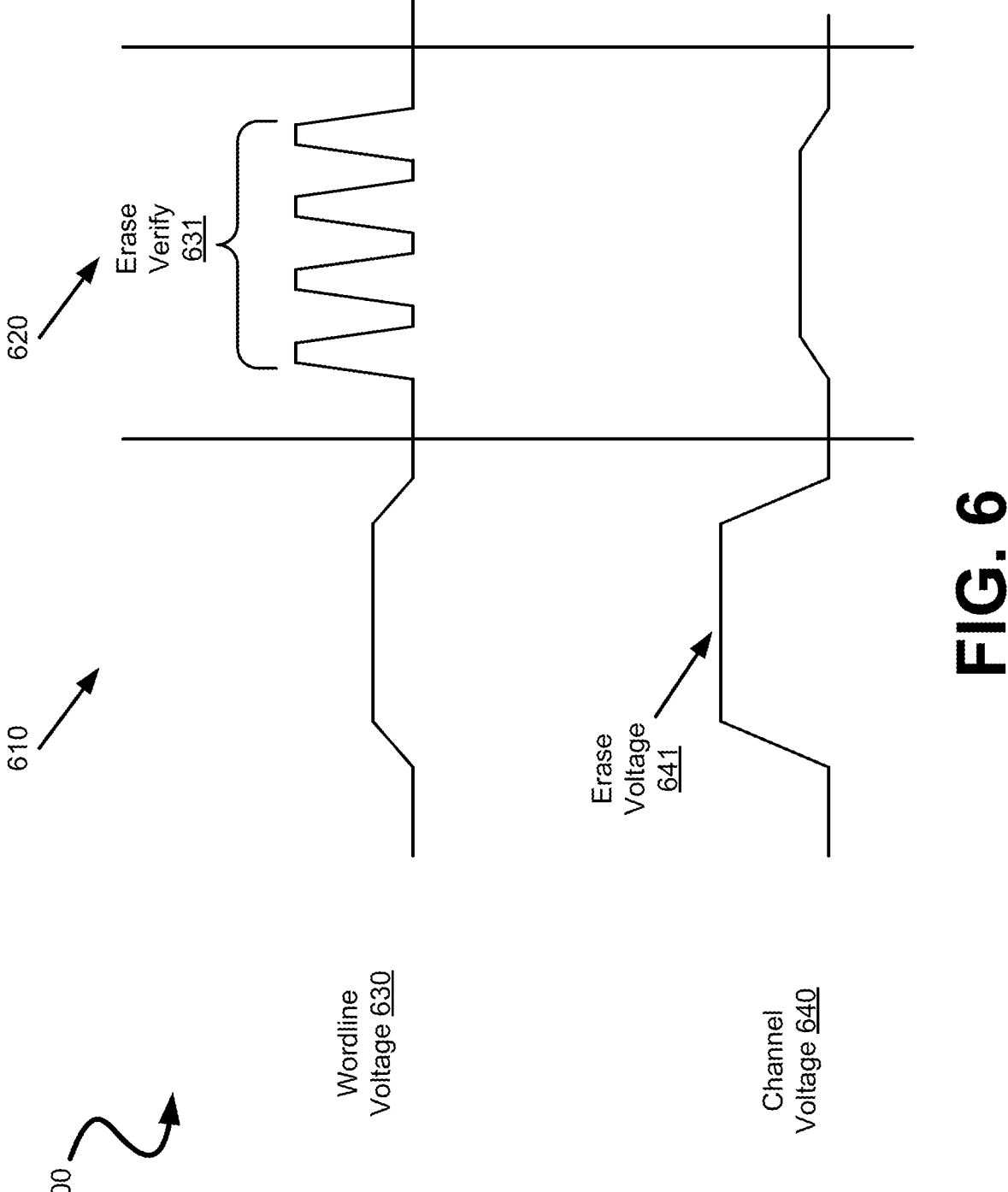
FIG. 6 illustrates an example timing diagram of a low stress refresh erase (LSRE) in a memory segment, in accordance with some embodiments of the present disclosure.

FIG. 6 illustrates a timing diagram 600 of a low stress refresh erase (LSRE) operation in a memory segment, in accordance with some embodiments of the present disclosure. In some embodiments, the LSRE operation can be performed on a segment of a memory device after the segment has been assigned to an intermediate pool (e.g., such as garbage pool or free pool as described with respect to FIGS. 3-5). During an erase operation performed on the segment, the local media controller can apply a wordline voltage 630 and a channel voltage 640. In this illustrative example, the erase operation includes two time intervals 610 and 620. However, the number of time intervals should not be considered limiting. More particularly, time interval 610 is associated with an erase, and time interval 620 is associated with an erase verify.

During time interval 610, a controller (e.g., local media controller or memory sub-system controller) can cause an erase voltage 641 to be applied across the channel. In some embodiments, the erase voltage 641 can be configured to erase a segment of memory. In some embodiments, erase voltage 641 can be of less magnitude than a corresponding erase voltage in an erase operation as described with reference to FIG. 2A-B.

During time interval 620, the controller can cause an erase verify voltage 631 to be applied a wordline. In some embodiments, the erase verify operation may be a NDEP check. In some embodiments, if the controller determines that the segment fails the erase verify operation, then the controller can repeat the operations of time interval 610 and the operations of time interval 620.

FIG. 7 illustrates a flow diagram of an example method for a low stress refresh erase (LSRE) in a memory segment, in accordance with some embodiments of the present disclosure. In some embodiments, a LSRE can be performed on a segment after the segment has been assigned to an intermediate pool (e.g., such as garbage pool or free pool as described with respect to FIGS. 3-5). The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 can be performed by the memory sub-system controller 115 and/or the local media controller 135 of FIG. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, processing logic causes a first erase operation to be performed on a memory segment (e.g., such as an erase operation as described in operation 230 with respect to FIGS. 2A/B). In some embodiments, the first erase operation can have an EOD erase policy. In some embodiments, the first erase operation can have a JiTE erase policy. In some embodiments, the first erase operation can have an EIA erase policy.

At operation 720, processing logic causes a first erase detection operation to be performed on the memory segment. In some embodiments, the first erase detection operation can be performed after a certain has elapsed since the first erase operation. In some embodiments, the first erase detection operation can be an NDEP check. In some embodiments, the processing logic can perform the erase detection operation to determine whether the first erase operation is valid. For example, processing logic can perform the erase detection operation periodically to ensure a voltage threshold shift has not occurred at one or more memory cells since a segment has been erased. In some embodiments, processing logic can cause a read voltage to be applied during the erase detection operation.

At operation 730, processing logic determines the segment fails to satisfy the erase detection operation. In some embodiments, processing logic can determine one or more wordlines of the segment exceed the read voltage. In such embodiments, processing logic can compare the number of wordlines to a threshold number and can determine the segment fails to satisfy the erase detection operation if the number of wordlines is equal to or greater than the threshold number. For example, due to voltage threshold shifts (e.g., due to holes de-trapping), certain memory cells or wordlines can shift beyond a threshold erase voltage level (e.g., the read voltage). When the processing logic determines the number of memory cells or wordlines shifting beyond the threshold erase voltage level is greater than the threshold number, the processing logic can proceed to operation 740.

At operation 740, processing logic causes a second erase operation to be performed on the memory segment. In some embodiments, the second erase operation can apply a second erase voltage having lower voltage magnitude than the erase voltage of operation 710 (e.g., such as the erase operation described in operation 230 with respect to FIGS. 2A/B). In some embodiments, the second erase voltage can be applied for a shorter duration than a duration of the erase voltage of operation 710.

At operation 750, processing logic causes a second erase detection operation to be performed on the memory segment. In some embodiments, the second erase detection operation can be an NDEP check. In some embodiments, processing logic might skip over operation 750, and instead proceed from operation 740 directly to operation 760. In some embodiments, the processing logic can determine the segment satisfies the second erase detection operation responsive to causing the second erase detection operation to be performed. For example, the processing logic can determine a number of wordlines satisfying the read voltage and compare the number of wordlines to a threshold number. The processing logic can determine the segment satisfies the erase detection operation if the number of wordlines is less than the threshold number.

At operation 760, processing logic receives the command to perform a program operation at the segment of the memory device after performing the second erase operation. In some embodiments, processing logic can cause a programming operation to be performed on the segment responsive to receiving the command. In some embodiments, responsive to receiving the command to perform a program operation, processing logic can assign the segment from an intermediate pool (e.g., a garbage pool or free pool as described with respect to FIGS. 3-5) to a programmable pool. In some embodiments, processing logic can perform the erase detection operation periodically (e.g., after the first duration elapses, after a certain time period elapses between erase detection operations, randomly after a previous erase detection operation, etc.) between causing the second erase operation to be performed and causing the programming operation to be performed at the segment of the memory device.

Figure 8:
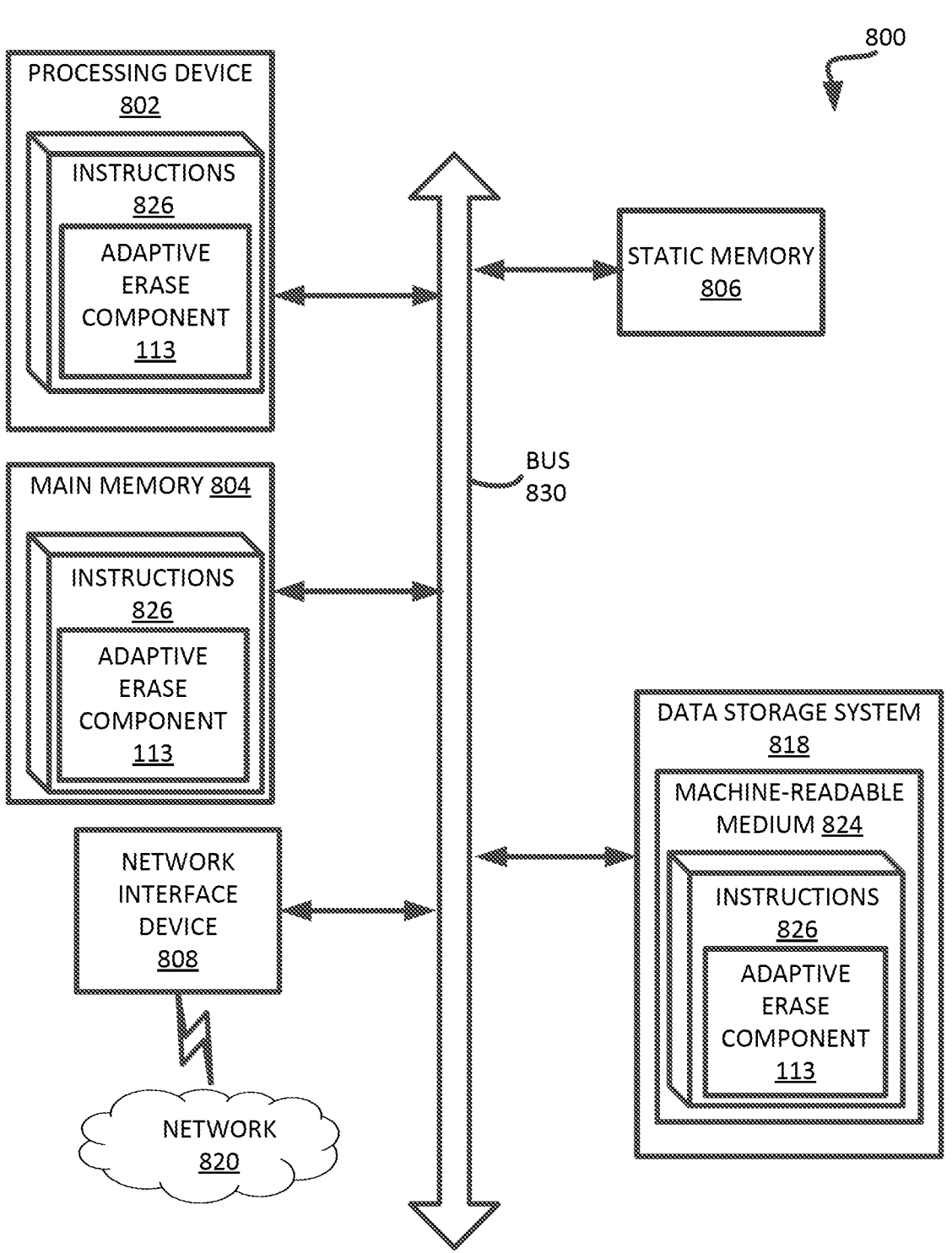
FIG. 8 illustrates an example block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the AEP component 113 of FIGS. 1A-B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to an adaptive erase component (e.g., the AEP component 113 of FIGS. 1A-B). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
   identifying a lifecycle state associated with a segment of the memory device;
   selecting, based on the lifecycle state, an erase policy from a plurality of erase policies for performing an erase operation with respect to the segment; and
   causing the erase operation to be performed with respect to the segment in accordance with the erase policy.

2. The system of claim 1, wherein:
   identifying the lifecycle state associated with the segment further comprises identifying a lifecycle metric associated with the segment; and
   selecting the erase policy further comprises, determining whether the lifecycle metric satisfies a threshold condition.

3. The system of claim 2, wherein the lifecycle metric comprises a program/erase (PIE) cycle count for the segment.

4. The system of claim 2, wherein selecting the erase policy further comprises, in response to determining that the lifecycle metric satisfies the threshold condition, selecting the erase policy as an erase policy providing a delay between the erase operation and a program operation to program the segment after the erase operation.

5. The system of claim 1, wherein causing the erase operation to be performed with respect to the segment in accordance with the erase policy further comprises:
   transferring the segment from a first intermediate pool to a second intermediate pool as a free segment; and
   erasing the free segment to obtain an erased segment.

6. The system of claim 5, wherein the operations further comprise:
   randomly selecting the erased segment from the second intermediate pool as a programmable segment; and assigning the programmable segment to a programmable pool available to be programmed during a program operation.

7. The system of claim 1, wherein causing the erase operation to be performed with respect to the segment in accordance with the erase policy further comprises:

assigning the segment to a first intermediate pool;

in response to assigning the segment to the first intermediate pool, erasing the segment; and after erasing the segment, assigning the segment as a free segment to a second intermediate pool.

8. The system of claim 7, wherein the operations further comprise:

determining whether the free segment is an oldest free segment within the second intermediate pool; and in response to determining that the free segment is the oldest free segment within the second intermediate pool, assigning the free segment as a programmable segment to a programmable pool available to be programmed during a program operation.

9. A method comprising:

identifying, by a processing device, a lifecycle state associated with a segment of a memory device;

selecting, by the processing device, based on the lifecycle state, an erase policy from a plurality of erase policies for performing an erase operation with respect to the segment; and causing, by the processing device, the erase operation to be performed with respect to the segment, in accordance with the erase policy.

10. The method of claim 9 wherein:

identifying the lifecycle state associated with the segment further comprises identifying a lifecycle metric associated with the segment; and selecting the erase policy further comprises determining, whether the lifecycle metric satisfies a threshold condition.

11. The method of claim 10, wherein the lifecycle metric comprises a program/erase (PIE) cycle count for the segment.

12. The method of claim 10, wherein selecting the erase policy further comprises, in response to determining that the lifecycle metric satisfies the threshold condition, selecting the erase policy as an erase policy providing a delay between the erase operation and a program operation to program the segment after the erase operation.

13. The method of claim 9, wherein causing the erase operation to be performed with respect to the segment in accordance with the erase policy further comprises:

transferring the segment from a first intermediate pool to a second intermediate pool as a free segment; and erasing the free segment to obtain an erased segment.

14. The method of claim 13, further comprising:

randomly selecting the erased segment from the second intermediate pool as a programmable segment; and assigning the programmable segment to a programmable pool available to be programmed during a program operation.

15. The method of claim 9, wherein causing the erase operation to be performed with respect to the segment in accordance with the erase policy further comprises:

assigning the segment to a first intermediate pool;

in response to assigning the segment to the first intermediate pool, erasing the segment; and after erasing the segment, assigning the segment as a free segment to a second intermediate pool.

16. The method of claim 15, further comprising:

determining whether the free segment is an oldest free segment within the second intermediate pool; and in response to determining that the free segment is the oldest free segment within the second intermediate pool, assigning the free segment as a programmable segment to a programmable pool available to be programmed during a program operation.

17. A system comprising:

a memory device; and a processing device, operatively coupled with the memory device, to perform operations comprising:

identifying a segment of the memory device, the segment having a lifecycle state associated with a first erase policy of a plurality of erase policies, wherein the first erase policy provides a delay between an erase operation and a program operation to program the segment after the erase operation; and causing the erase operation to be performed with respect to the segment in accordance with the erase policy, wherein causing the erase operation to be performed comprises assigning the segment to a first intermediate pool.

18. The system of claim 17, wherein the lifecycle state is associated with the segment having a lifecycle metric satisfying a threshold condition.

19. The system of claim 17, wherein causing the erase operation to be performed further comprising:

transferring the segment from the first intermediate pool to a second intermediate pool as a free segment;

erasing the free segment to obtain an erased segment;

randomly selecting the erased segment from the second intermediate pool as a programmable segment; and assigning the programmable segment to a programmable pool available to be programmed during a program operation.

20. The system of claim 17, wherein causing the erase operation to be performed further comprising:

in response to assigning the segment to the first intermediate pool, erasing the segment;

after erasing the segment, assigning the segment as a free segment to a second intermediate pool;

determining whether the free segment is an oldest free segment within the second intermediate pool; and in response to determining that the free segment is the oldest free segment within the second intermediate pool, assigning the free segment as a programmable segment to a programmable pool available to be programmed during the program operation.

* * * * *